United States Patent

Class

[11] Patent Number: 5,910,788
[45] Date of Patent: Jun. 8, 1999

[54] PREDICTIVE APPROACH INTEGRITY

[75] Inventor: Kim A. Class, Glendale, Ariz.

[73] Assignee: Honeywell, Inc.

[21] Appl. No.: 08/843,941

[22] Filed: Apr. 17, 1997

[51] Int. Cl.$^6$ .............................. H04B 7/185; G01S 5/02
[52] U.S. Cl. ............................................ 342/357; 701/214
[58] Field of Search ............................ 342/357; 701/214

[56] References Cited

U.S. PATENT DOCUMENTS

| 5,202,829 | 4/1993 | Geier ........................................ 342/357 |
| 5,343,209 | 8/1994 | Sennott et al. ........................... 342/357 |
| 5,504,492 | 4/1996 | Class et al. .............................. 342/357 |
| 5,523,763 | 6/1996 | Loomis ..................................... 342/357 |
| 5,600,329 | 2/1997 | Brenner . | |

OTHER PUBLICATIONS

Stayton et al co–pending application, serial #08/504,977, filed Jul. 20, 1995.

Primary Examiner—Theodore M. Blum

[57] ABSTRACT

A method and apparatus are provided for predicting the position error bound in a satellite positioning system at a future time. The future position of each satellite at the future time is calculated from the trajectory data obtained from each satellite. The predicted position for each satellite and the estimated position of the satellite positioning system receiver is then used to generate a line of sight matrix at the future time from which a position error bound is determined.

9 Claims, 1 Drawing Sheet

PREDICTIVE APPROACH INTEGRITY

FIELD OF THE INVENTION

The present invention pertains to satellite positioning systems, and more specifically a system for predicting the value of a future error position bound with respect to the estimated GPS derived position.

BACKGROUND OF THE INVENTION

Satellite positioning systems are now well-known in the art. Such systems, for example, NAVSTAR-GPS are rapidly being used for determination of the geocentric position of mobile units, such as water and land vehicles, aircraft and survey equipment to name a few.

In aircraft, GPS systems are being utilized for navigation, flight control, and air space control. These GPS systems may operate independently or in combination with inertial reference systems or attitude heading reference systems in order to provide information during an aircraft flight mission. Global positioning systems similar to NAVSTAR commonly use a GPS receiver, located on a mobile unit, for receiving satellite information signals transmitted from a plurality of satellites. Each GPS satellite transmits an information signal containing data that allows a user to determine the range or distance between selected GPS satellites and the antenna associated with the mobile unit's GPS receiver. These distances are then used to compute the position of the receiver unit using known triangulation techniques. For example, in the NAVSTAR-GPS system, a mobile unit with a GPS receiver, such as an aircraft, detects a pseudo random code contained in a given GPS satellite information signal and derives therefrom the "elapsed time" or time delay between the transmission of the signal and its reception at the GPS receiver. From this time delay, the GPS receiver can derive the range between the GPS receiver antenna and the satellite, sometimes referred to as the pseudo-range or pseudo-range measurements. Herein, the GPS receiver's position, or the mobile unit's position, generally refers to the corresponding antenna position.

In addition, as part of the NAVSTAR-GPS system, each satellite information signal also contains precise ephemeris data and course almanac data which both describe the corresponding satellite orbital trajectory in earth centered space as is well known in the art. The coordinates of the satellite's orbital position may be derived from either the ephemeris data or the almanac data. The geocentric position of the satellite may be calculated with a higher degree of precision from the ephemeris data than is possible with the almanac data. However, because the ephemeris data precisely describes the satellite trajectory at the moment of transmission of the satellite information signal, it is only valid for a few hours thereafter, as is well known.

It should be understood that the mobile unit's three-dimensional geocentric position in World Geodetic System Coordinates may be determined using either the ephemeris data or almanac data received from four or more satellites. Herein, it should be recognized by those skilled in the art that the World Geodetic System is an earth-centered, earth-fixed geocentric coordinate system, which may be converted to any other coordinate system as required by the user. Sometimes the aforementioned coordinate system is referred to as the WGS84 earth-centered, earth-fixed, rectangular coordinate frame. Herein, the World Geodetic System Coordinates should be presumed, and position refers to this three dimensional WGS84 coordinate system.

In order to determine the position of the GPS receiver unit, a minimum of four satellite signals are required rather than the expected three. This is so, since the GPS receiver includes a receiver clock which is not as accurate as the atomic clock of the satellites. Therefore, receiving satellite information signals from four different satellites provides a complete solution which permits the correction of any receiver clock error as is well understood in the art. Herein, the corrected receiver clock time is referred to as the receiver time. Thus, if signals from four or more satellites are available to the GPS receiver unit, the geocentric position of the receiver may be determined within approximately one-hundred meters of its "true" geocentric position. Herein, the receiver position derived by the triangulation technique using data from multiple satellites is referred to as the "estimated position". The accuracy of the estimated position of the receiver unit is dependent upon many factors including, among others, atmospheric conditions, selective availability, and the relative position of the satellites with respect to the line of sight view of the satellites.

Associated with a GPS estimated position is a "position error bound" as particularly defined by accepted GPS system standards which have been developed by the Radio Technical Commission for Aeronautics (RTCA), in association with aeronautical organizations of the United States from both government and industry. The RTCA has defined the phrase "GPS system integrity" as the ability of a GPS system to provide timely warnings to users when the GPS system should not be used for navigation. "System integrity" is particularly identified in a document entitled "Minimum Operational Performance Standards for Airborne Supplemental Navigation Equipment Using Global Positioning System (GPS)", document number RTCA/DO-208, July 1991, prepared by: SC-159, beginning at section 1.5. As described therein, GPS is complicated in that it is a four-dimensional system involving three components of position and one time component. As also described in the aforesaid RTCA publication, the signal-in-space error transforms into a horizontal position error via a relatively complex function of the satellite geometry at any given moment. The GPS integrity system must interpret the information it has about the pseudo-range errors in terms of the induced horizontal and vertical position errors, commonly referred to as the "position error bounds", and then make a decision as to whether the position error bounds are outside the allowable radial error, specified for a particular phase of the flight mission in progress. The allowable error is referred to as the "alarm limit", herein referred to as the integrity alarm limit. If the horizontal position error bound is found to exceed the integrity alarm limit, a timely warning must be issued by the GPS system receiver unit or sub-system.

Two rather distinct methods of assuring GPS integrity have evolved as civil use of GPS has progressed. One is the Receiver Autonomous Integrity Monitoring (RAIM concept, and the other is the ground monitoring approach that goes under the name "Wide Area Augmentation System" (WAAS). The intent of both of these methods is the calculation of the position error bound with regard to the current GPS estimated position so that it may be compared with the alarm limit associated with a particular phase of the flight mission.

The Receiver Autonomous Integrity Monitoring System employs a self consistency check among the measurements, more specifically, the pseudo-range measurements. Satellite redundancy is required to perform a self-consistency check on an instantaneous basis. Thus, five satellites must be in view, i.e., satellite signals received and pseudo range measurements calculated by the GPS receiver. If fewer than five satellites are in view the value of the predicted position error bound will be infinite. Also, there are constraints on the satellite constellation geometry that must be met if the check is to be effective in the presence of noise. Generally speaking, a satellite constellation with many satellites in view, permits a robust integrity monitoring system. Conversely, a satellite constellation having only a few satellites in view may limit the availability of an integrity monitoring system. There may be short periods when a good consistency check is not possible (less than 5 satellites in view). The main feature of RAIM is that it is completely self-contained and relatively easy to implement in software.

Examples of RAIM may be found in the aforementioned RTCA publication, Appendix F, and another is described in an article entitled "Implementation of a RAIM Monitor in a GPS Receiver and an Integrated GPSMU" by Mats Brenner located at page 397 in the Proceedings of ION GPS-90, Third International Technical Meeting of the Satellite Division of the Institute of Navigation, Sept. 19–21, 1990.

GPS systems which incorporate RAIM output a position error bound which represent the probabilistic radial errors of the navigation solution, namely the GPS estimate position of the receiver unit. Currently, RAIM may generate several numbers including, a horizontal position error bound, a vertical position error bound, and a spherical position error bound for the current time, i.e., the instant of time the GPS measurements occurred. A calculation for the horizontal position error bound is further described in equation 21 of the aforementioned Mats Brenner paper. Herein the term, position error bound, will be used to denote either separately or the combination of the horizontal. vertical and spherical position error bounds.

Once calculated, the position error bound is used to determine if the pilot can rely on the derived GPS estimated position for the current phase of flight. It should be recognized that some interpolation may be required dependent upon the receiver's ability to simultaneously receive a plurality of satellite information signals as is well understood in the art.

The allowable integrity alarm limit value, may change depending on the phase of the aircraft flight mission. For instance, if a pilot is flying in the termninal phase, the integrity alarm limit may be less stringent than if the pilot is in the approach phase of flight. If the pilot is to transition from the terminal phase of flight to the approach phase of flight, the pilot needs to know whether the current position error bound is sufficient to allow the pilot to rely upon the GPS solution to make the transition.

GPS systems may provide the pilot a predicted position error bound based on the estimated time of arrival (ETA) at the destination. In this scenario however, the predicted position error bound may be unreliable, or overly optimistic for several reasons. First, the aircraft may arrive at a time other then original ETA. Thus, satellites predicted to be available at the original ETA may not be available at the revised ETA. Secondly, a satellite information signal that was predicted to be available at the original ETA, might not be able to be obtained by the GPS receiver when predicted. This could be due to atmospheric effects, satellite failure, signal blockage, or receiver shielding. If the position error bound is not within the specified integrity alarm limit once the pilot has committed to the approach phase of the flight, a pilot may have to execute a missed approach.

SUMMARY OF THE INVENTION

The present invention provides a satellite positioning system integrity monitoring system for future phases of flight so as to provide the pilot a timely warning as to whether or not estimated position information may be used for navigation and/or flight control. In the present invention, the future position of each satellite at a future time is calculated from the trajectory data obtained from each satellite utilized in the current estimated position determination. The predicted position for each satellite and the estimated position of the satellite positioning system receiver is then used to generate a line of sight matrix at the selected future time from which an integrity processor with measurement statistics provided by a ground station derives an accurate reading of a predicted position error bound value at the future time.

DETAILED DESCRIPTION OF THE PRESENT INVENTION

Figure 1:
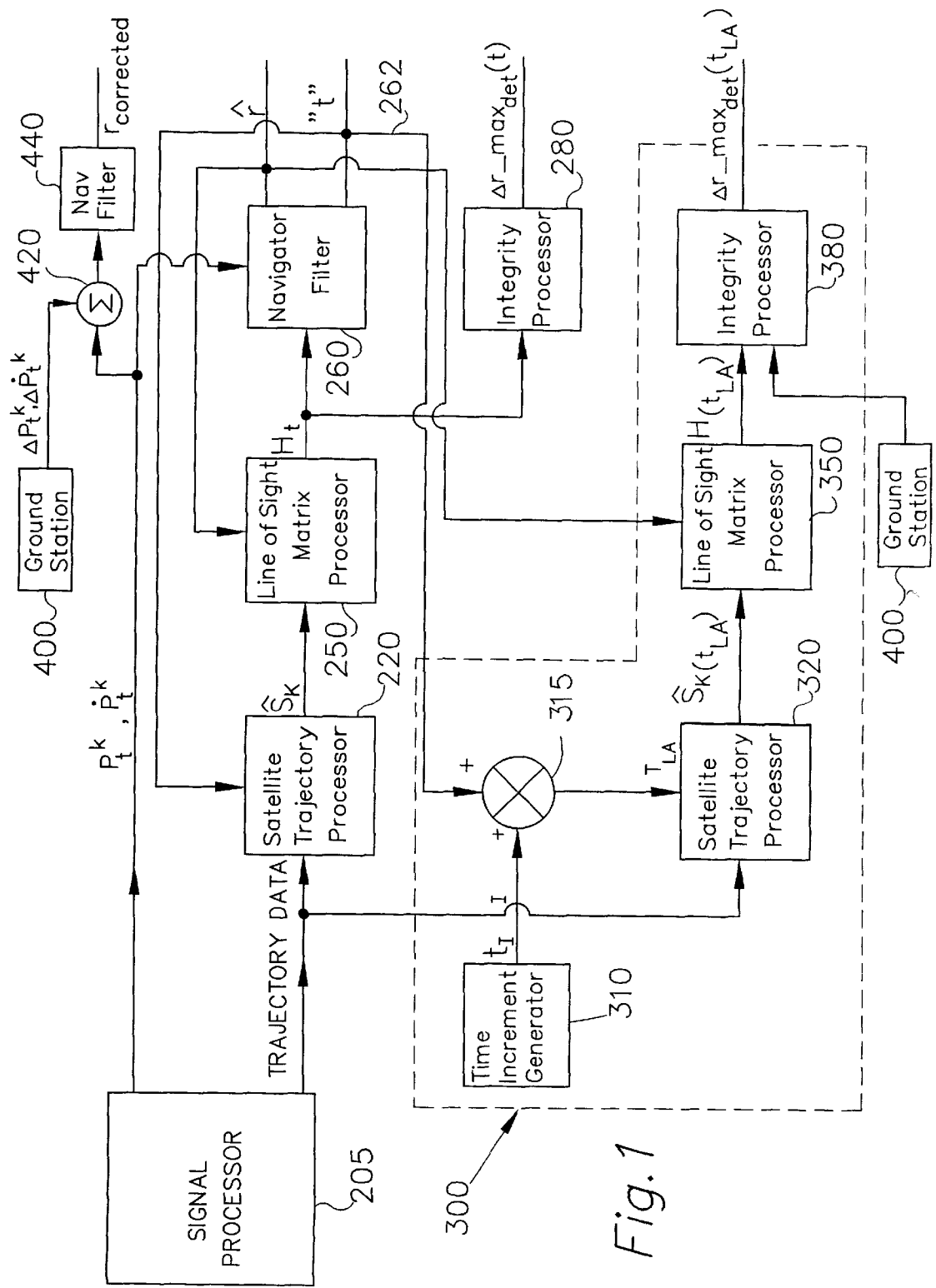
FIG. 1 is a schematic block diagram of the satellite positioning system of the present invention.

The operation of a GPS system is well known in the art and a detailed description explaining the operation of a GPS system will not be discussed in the detailed description. However, the references mentioned above provides further information of a GPS system if more description is desired.

Illustrated in FIG. 1 is a schematic block diagram of a "look-ahead" GPS predictive approach integrity monitoring system 300 constructed in accordance with the present invention. Monitoring system 300 is comprised of a time increment value generator 310, a summing means 315, a satellite trajectory processor 320, a line of sight matrix processor 350, an integrity processor 380 and a ground station 400.

Time increment generator 310 produces a time increment value, $t_I$, representing the quantity of time monitoring system 300 is to look beyond the time value 262 produced by navigation filter 260. In the preferred embodiment, the time increment value $t_I$ is a constant. It should be noted however, that the time increment value, $t_I$ may be selectively changed by either human or computer control.

Summing means 315 serves to sum the time value "t", on data signal line 262, from Navigation filter 260 and the time increment value $t_i$ to establish a "look ahead" time value $t_{LA}$. It should be noted that the time value t and $t_{LA}$ represent atomic clock time from which the positions of the satellites in the GPS system may be determined from the trajectory data e.g. almanac or ephemeris data.

Satellite trajectory processor 320 receives the trajectory data produced by signal processor 205 and the look ahead time value, $t_{LA}$. Based on the trajectory data received at time t, satellite trajectory processor 320 predicts the position of each satellite, k, for time $t_{LA}$. The predicted positions of the k satellites at time $t_{LA}$ are identified as:

$\hat{S}_k(t_{LA})$

Line of sight matrix processor 350, similar to line of sight processor 250, calculates a line of sight-matrix $H(t_{LA})$ in response to the predicted satellite position information from satellite trajectory processor 320 and the estimated corrected position $\hat{r}$, from navigation filter 440. The ground station 400 also provides corrections to the pseudo range rate in the form of the values $\Delta P_t^k$ and $\Delta \dot{P}_t^k$ which correct the predicted values $P_t^k$ and $\dot{P}_t^k$ through a summing means 420. The estimated corrected position is then provided after processing by the navigation filter 440.

In the preferred embodiment, line of sight matrix processor 350 utilizes the estimated corrected position $r_{corrected}$ at time t, as opposed to a predicted GPS estimated position at the look ahead time value $t_{LA}$. This implies that over the predicted time increment value $t_f$, the line of sight matrix is predominately affected by the change in satellite position, rather than changes in the position of the mobile unit. It should be noted however, that circuitry or software may be constructed which could provide matrix processor 350 with a predicted GPS estimated position of the mobile unit at time $t_{LA}$. This could be accomplished through the use of internal navigation equipment and/or the FMS (not shown).

Ground Station 400 supplies input measurement statistics such as $D_{(fail)}$, $\sigma_{(fail)}$, $\sigma_{(noise)}$, and mask angle that is used with $H(t_{LA})$ from line of sight matrix processor to the integrity processor 380 to calculate a predicted position error bound at time $t_{LA}$ identified as:

$$\Delta r\_max_{def}(t_{LA})$$

where $D_{(fail)}$ is a mean value of the noise, $\sigma_{(fail)}$ is the standard deviation value under a failure of the satellite, $\sigma_{(noise)}$ is the standard deviation value of noise in each satellite in a non-failure condition, and the mask angle. The airborne receiver will make a prediction at $t_{LA}$ using measurement statistics received from the ground station. For purposes of the description of the preferred embodiment, values $D_{(fail)}$, $\sigma_{(fail)}$, $\sigma_{(fail)}$ are used, but other measurement statistics' values may be used as well. This predicted position error bound at time $t_{LA}$ is a prediction of what the position error bound may be at time $t_{LA}$. The calculation of these values is performed by the method taught in Patent application "Differential Satellite Positioning System Ground Station With Integrity Monitoring" by Mats Brenner, U.S. Ser. No. 08,497,995, now U.S. Pat. No. 5,600,329.

In the preferred embodiment of the invention, line of sight processor matrix processor 350 and integrity processor 380 include processing functions which eliminate satellite position information for calculation of the predicted RAIM derived position error bound when the satellites do not meet the "in view" requirements. Namely, those satellites which would be less than the mask angle value from the horizon are discarded and not used as part of the calculations for either the predicted line of sight matrix and/or the predicted position error bound value at time $t_{LA}$.

In the preferred embodiment of the invention, it is intended that integrity monitoring system 300 make integrity monitor measurements in which the satellite positions are predicted some fixed time value ahead of the time from which the last estimated position was calculated by Navigation filter 260. In accordance with the present invention, the pilot of an aircraft may continue to be given position error bound values, for future phases of a flight by a selected time increment value, $t_f$. This time increment value may be either fixed, or pilot selected, as desired. The ability to have the look ahead GPS position error bound values is of particular importance during the latter phases of a flight mission, more specifically, during the descent and the landing approach flight phases. In practice of the present invention, the pilot may be able to determine whether or not the GPS aircraft position information may be relied upon for the descent and approach, and take necessary action in case the GPS integrity is beyond that required for pilot reliance.

For example, it may be necessary for the pilot to delay the final approach or descent phases of the flight mission such that the satellite constellation is allowed to be in a position whereby the pilot may rely upon the GPS position information and utilize such information for both navigation, flight control, and also landing of the aircraft. Alternatively, the pilot may take other actions, namely not relying upon the use of GPS at all during the final phases of the flight. Thus, in practice of the present invention, the pilot is allowed to make such decisions in advance, heretofore not available, with reliance on accuracy of the GPS solution of future phases of the flight mission.

In the preferred embodiment of the present invention (i) the predicted position error bound is based on the trajectory data from the more precise ephemeris data of only those satellites whose pseudo-range information is currently being utilized in the position calculation; and (ii) the look ahead time increment value is chosen to be only a few minutes. This obviates problems associated with pilot reliance on a predicted GPS position error bound at the flight mission ETA (estimated time of arrival), Thus, even if the landing is at a time other then the original ETA, the pilot will still have a look-ahead indication of GPS availability. It should be noted that embodiments of the present invention can be constructed in which the predicted position error bound is based on the trajectory data from the less precise almanac data of only those satellites whose pseudo-range information is currently being utilized in the GPS estimated position calculation The present invention has been described in terms of schematic block diagrams employing one GPS system integrity monitoring scheme for providing a position error bound in accordance with a specific GPS integrity monitoring scheme. As indicated, there are other satellite positioning system integrity monitoring schemes which may be alternatively employed, and are intended to be within the true spirit and scope of the present invention.

The embodiments of an invention in which an exclusive property or right is claimed are defined as follows:

1. A satellite positioning system comprising:

a satellite positioning system receiver for receiving satellite information signals from selected ones of a plurality of satellites, and for deriving corresponding satellite data from selected ones of said satellite information signals, where each of said satellites transmits a satellite information signal containing satellite data sufficient to determine the corresponding range between the satellite and said satellite positioning system receiver, and which said satellite data from selected ones of a plurality of satellites is sufficient to determine an estimated geocentric position of said satellite positioning system receiver;

an information signal processor for deriving from said satellite data at least i) information for determining the trajectory of each of said selected ones of said plurality of satellites, and ii) a pseudo range value between said receiver and each of said selected one of said plurality of satellites, where said pseudo range value is an estimate of the true range value between said receiver and said selected ones of said plurality of satellites determined by a measurement of the corresponding satellite signal travel time from the satellite to the receiver;

means for deriving an estimated geocentric position of said receiver, at a particular time, as a function of selected ones of said pseudo range values and corresponding ones of the geocentric positions of said plurality of said satellites derived from said trajectory information;

means for deriving a line of sight vector measurement matrix H in which said line of sight vector measurement matrix is descriptive of the vectors between said estimated geocentric position of the receiver and said geocentric position of said selected satellites at a selected future time;

an integrity processor responsive to said line of sight vector measurement matrix H at said selected future time; and a ground station providing measurement statistics to the integrity processor for determining an improved accurate reading of a position error bound value at said future time.

2. The global positioning system of claim 1 comprising:

means for determining an error value associated with each of said pseudo range values, where each of said error values relates the difference between said pseudo range value and a corresponding estimated range value, where said estimated range value is substantially the vector magnitude of the vector between said estimated position of said receiver and the corresponding one of said geocentric position of said satellites;

wherein said integrity processor is responsive to said line of sight vector measurement matrix H at said selected future time and said error values for predicting a position error bound having a selected reliability.

3. A method for determining a future time position error bound value in a satellite positioning system receiver comprising the steps of:

(a) receiving, from a satellite position system, satellite trajectory data from one or more tracked satellites, a receiver time, and an estimated position of a satellite position system receiver;

(b) generating a look-ahead time by adding a time increment to said receiver time;

(c) calculating a predicted position for each satellite based on the trajectory data for each satellite and the look-ahead time;

(d) using the predicted position for each satellite and the estimated position of the satellite position system receiver to generate a line of sight matrix;

(e) providing measurement statistics;

(f) producing a predicted position error bound from said line of sight matrix in combination with the measurement statistics.

4. The method in claim 3 wherein said estimated position is the position of the satellite position system receiver at the receiver time.

5. The method in claim 3 wherein said estimated position is a predicted location of the satellite position system receiver at the look-ahead time.

6. The method in claim 3 wherein said time increment is 5 minutes.

7. The method in claim 3 wherein said time increment may be altered.

8. The method in claim 3 wherein said trajectory data is almanac data.

9. The method in claim 3 wherein said trajectory data is ephemeris data.

* * * * *